(12) United States Patent
Ye (10) Patent No.: US 11,609,659 B2
(45) Date of Patent: Mar. 21, 2023

(54) TOUCH DISPLAY PANEL, TOUCH DISPLAY DEVICE AND METHOD FOR DRIVING THEREOF BY TOUCHING

(71) Applicant: WUHAN CHINA STAR OPTOELECTRONICS SEMICONDUCTOR DISPLAY TECHNOLOGY CO., LTD., Hubei (CN)

(72) Inventor: Jian Ye, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 70 days.

(21) Appl. No.: 16/978,854

(22) PCT Filed: Jul. 16, 2020

(86) PCT No.: PCT/CN2020/102419
§ 371 (c)(1),
(2) Date: Sep. 8, 2020

(87) PCT Pub. No.: WO2021/253552
PCT Pub. Date: Dec. 23, 2021

(65) Prior Publication Data
US 2021/0397341 A1    Dec. 23, 2021

(30) Foreign Application Priority Data
Jun. 19, 2020  (CN) .......................... 202010562781.9

(51) Int. Cl.
G06F 3/041    (2006.01)
G06F 3/044    (2006.01)

(52) U.S. Cl.
CPC ...... G06F 3/041662 (2019.05); G06F 3/0446 (2019.05); G06F 3/0418 (2013.01)

(58) Field of Classification Search
CPC .................... G06F 3/041662; G06F 3/0446
USPC ................................................. 345/173, 174
See application file for complete search history.

(56) References Cited

U.S. PATENT DOCUMENTS

2011/0084857 A1    4/2011  Marino et al.
2015/0116247 A1*   4/2015  Inoue ................. G06F 3/04166
                                                           345/173
2016/0077617 A1    3/2016  Lee
(Continued)

FOREIGN PATENT DOCUMENTS

CN    102576272 A    7/2012
CN    103207695 A    7/2013
CN    107508994 A    12/2017
(Continued)

*Primary Examiner* — Calvin C Ma
(74) *Attorney, Agent, or Firm* — PV IP PC; Wei Te Chung; Ude Lu (57) ABSTRACT

In a touch display panel, different report rates are used in a first partition and a second partition, which may achieve better experience in touch operations with lower power consumption. That is, touch operations performed with a high frequency in a specific partition may be achieved for users without excessively increasing entire power consumption of the display panel. Standby time is prolonged for providing better experience for users.

20 Claims, 3 Drawing Sheets

(56) References Cited

U.S. PATENT DOCUMENTS

2016/0117046 A1 4/2016 Zhong et al.
2021/0200413 A1* 7/2021 Jang .................... G06F 3/04166

FOREIGN PATENT DOCUMENTS

CN 110362225 A 10/2019
WO 2015070436 A1 5/2015

* cited by examiner

TOUCH DISPLAY PANEL, TOUCH DISPLAY DEVICE AND METHOD FOR DRIVING THEREOF BY TOUCHING

TECHNICAL FIELD

The present application relates to a touching-display technology field, in particular to a touching-driving technology field, and specifically in particular to a touch display panel, a touch display device and a method for driving thereof by touching.

BACKGROUND

With increasing demands for refresh rates of touch display screens, it follows that there is also an increasing demand for report rates used for touch operations. Touch functions having faster response and smoother interaction and performed by users can be realized by high report rates.

Report rates of existing touch display screens are adjusted as a whole, that is, either all use high report rates or low report rates are used for touch operations. For the touch display screens, performing with high report rates means working with high frequencies, and charging and discharging speed of capacitive electrodes used for achieving touching and sensing are also accelerated, which will inevitably increase entire power consumption of the touch display screens and reduce standby time, which causes a poor experience for users.

Therefore, ways of achieving better experience in touch operations in the touch display screen for users (that is, using high report rates to perform touch operations) and effectively reducing entire power consumption of the touch display screen to prolong standby time are problems that the industry urgently needs to solve.

Technical Problem

The present application provides a touch display panel, which solves problems of how to achieve better experience in touch operations and low power consumption in the same touch display panel at the same time.

Technical Solution

In a first aspect, the present application provides a touch display panel, operating at least in a first working mode and a second working mode and comprising a first partition and a second partition, wherein each of the first partition and the second partition comprises a plurality of touch units; wherein in response to operating in the first working mode by the touch display panel, a first report rate is used by all the touch units in the first partition for sampling touch signals and a second report rate is used by all the touch units in the second partition for sampling touch signals, and the first report rate is as the same as or is different from the second report rate; and wherein in response to operating in the second working mode by the touch display panel, a third report rate is used by all the touch units in the first partition for sampling touch signals and a fourth report rate is used by all the touch units in the second partition for sampling touch signals, and the third report rate is different from the fourth report rate.

Based on the first aspect, in a first embodiment of the first aspect, the touch display panel further comprise a touch driving integrated circuit (IC) electrically connected to the touch units of the first partition and the second partition; wherein in response to operating in the first working mode by the touch display panel, the touch driving IC provides a touch driving signal with a first driving frequency for the touch units of the first partition and provides a touch driving signal with a second driving frequency for the touch units of the second partition, and the first driving frequency is as the same as or is different from the second driving frequency; and wherein in response to operating in the second working mode by the touch display panel, the touch driving IC provides a touch driving signal with a third driving frequency for the touch units of the first partition and provides a touch driving signal with a fourth driving frequency for the touch units of the second partition, and the third driving frequency is different from the fourth driving frequency.

Based on the first embodiment of the first aspect, in a second embodiment of the first aspect, each pair of the first driving frequency and the first report rate, the second driving frequency and the second report rate, the third driving frequency and the third report rate frequency, and the fourth driving frequency and the fourth report rate satisfies the following relation:

$$RP=1/((1/F)*M)$$

wherein RP is a corresponding report rate, F is a corresponding driving frequency, 1/F is a corresponding driving period, and M is the number of times of scans, which is the number of driving periods in a scan period.

Based on the second embodiment of the first aspect, in a third embodiment of the first aspect, the first partition and the second partition use a same number of times of scans.

Based on the first embodiment of the first aspect, in a fourth embodiment of the first aspect, the touch driving IC utilizes non-noise frequencies to configure the first driving frequency, the second driving frequency, the third driving frequency, and the fourth driving frequency.

Based on the first aspect, in a fifth embodiment of the first aspect, the touch display panel comprises a plurality of first touch electrodes arranged in a first direction and a plurality of second touch electrodes arranged in a second direction, wherein each of the touch units comprises a pair of the first touch electrode and the second touch electrode that are disposed opposite to each other; wherein the touch driving IC is electrically connected to the first touch electrodes of the first partition and the second partition, and is configured to provide the first touch electrodes with a touch driving signal having at least one type of driving frequencies comprising the first driving frequency, the second driving frequency, the third driving frequency, and the fourth driving frequency; and wherein the touch driving IC is further electrically connected to the second touch electrodes of the first partition and the second partition, and is configured to receive a touch signal having a mixed frequency and generated by the second touch electrodes of the first partition and the second partition.

Based on the fifth embodiment of the first aspect, in a sixth embodiment of the first aspect, the touch driving IC comprises a filter; wherein the filter is configured to separate the touch signal having the mixed frequency to obtain a corresponding single-frequency touch signal.

Based on the first aspect, in a seventh embodiment of the first aspect, a ratio of the third report rate to the fourth report rate is a positive integer, or a ratio of the fourth report rate to the third report rate is a positive integer.

In a second aspect, the present application provides a touch display device, comprising the touch display panel as describe in any embodiment of the first aspect.

In a third aspect, the present application provides a method for driving a touch display panel by touching, wherein the touch display panel comprises a first partition and a second partition, and the method comprises steps of: outputting touch driving signals with the same or different driving frequencies to the corresponding first partition and second partition by the touch driving integrated circuit (IC); receiving a touch signal having a mixed frequency and generated by the first partition and the second partition by the touch driving IC; filtering the touch signal having the mixed frequency by the touch driving IC to obtain a corresponding single-frequency touch signal; and calculating touch coordinates and reporting the touch coordinates by using different report rates by the touch driving IC according to a frequency and change of the single-frequency touch signal.

Based on the third aspect, in a first embodiment of the third aspect, wherein each of the first partition and the second partition comprises a plurality of touch units electrically connected to the touch driving IC; and wherein the touch units are configured to access the touch driving signals to generate corresponding touch signals.

Based on the first embodiment of the third aspect, in a second embodiment of the third aspect, each of the touch units comprises a pair of the first touch electrode and the second touch electrode that are disposed opposite to each other; the first touch electrodes are configured to access the corresponding touch driving signals; the second touch electrodes are configured to generate the corresponding touch signals.

Based on the third aspect, in a third embodiment of the third aspect, wherein the touch driving IC outputs a touch driving signal with a third driving frequency to the first partition, and the touch driving IC outputs a touch driving signal with a fourth driving frequency to the second partition, wherein the third driving frequency is different from the fourth driving frequency.

Beneficial Effect

The present application provides a touch display panel, different report rates are used in a first partition and a second partition, which may achieve better experience in touch operations with lower power consumption. That is, touch operations performed with a high frequency in a specific partition may be achieved for users without excessively increasing entire power consumption of the display panel. Standby time is prolonged for providing better experience for users.

DETAILED DESCRIPTION OF PREFERRED EMBODIMENTS

To make objectives, technical solutions, and effects of the present application clearer and more specific, the present application is described in further detail below with reference to embodiments in accompanying with appending drawings. It should be understood that specific embodiments described herein are merely for explaining the present application, and the present application is not limited thereto.

Figure 1:
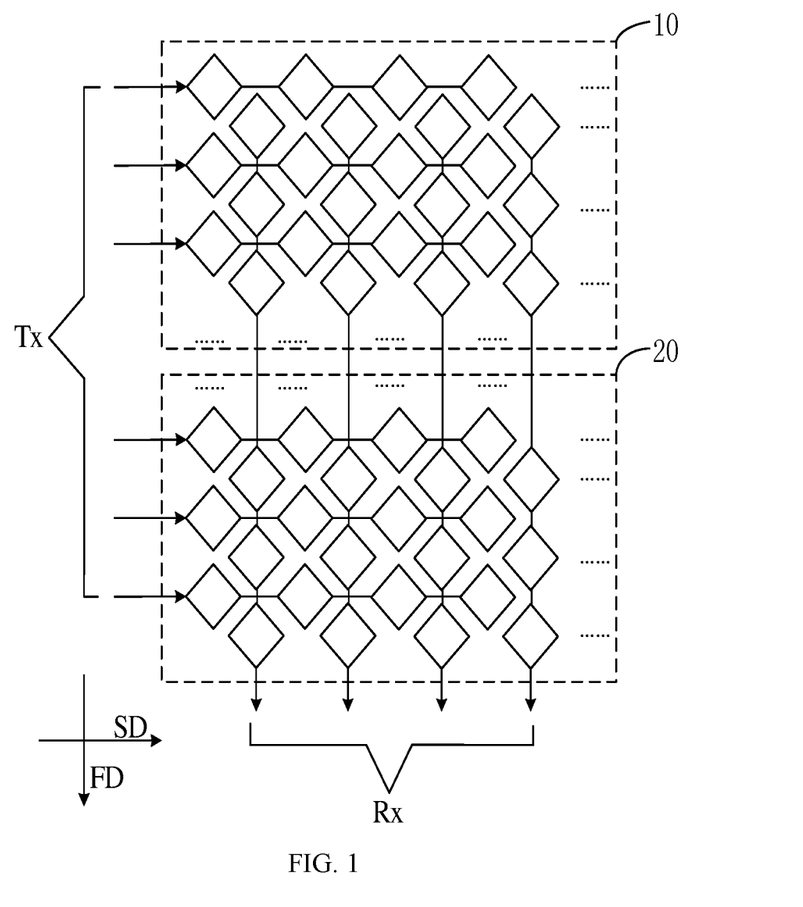
FIG. 1 is a first schematic diagram showing a structure of a touch display panel according to an embodiment of the present application.

As shown in FIG. 1, the present application provides a touch display panel, which may operate at least in a first working mode and a second working mode (that is, which may also operate in other working modes, and there is no limitation here), wherein the first working mode may be, but not limited to be, performed separately from the second working mode. The touch display panel includes a first partition 10 and a second partition 20, and each of the first partition 10 and the second partition 20 includes a plurality of touch units (not shown). In response to operating in the first working mode by the touch display panel, a first report rate is used by all the touch units in the first partition 10 for sampling touch signals and a second report rate is used by all the touch units in the second partition 20 for sampling touch signals, and the first report rate is as the same as or is different from the second report rate. In response to operating in the second working mode by the touch display panel, a third report rate is used by all the touch units in the first partition 10 for sampling touch signals and a fourth report rate is used by all the touch units in the second partition 20 for sampling touch signals, and the third report rate is different from the fourth report rate.

In the present embodiment, the first partition 10 and second partition 20 are provided with a plurality of scanning electrodes Tx and sensing electrodes Rx crossing to each other. In the first partition 10 and the second partition 20, scanning signals with the same or different driving frequencies are carried by the scanning electrodes Tx, and sensing signals received at a fixed time interval are carried by the sensing electrodes Rx.

It can be understood that the touch display panel may include a partition using a higher frequency to perform touch operations and a partition using a lower frequency to perform touch operations. The first partition 10 or the second partition 20 may be one of the two partitions, and the first partition 10 is different from the second partition 20. The partition using the higher frequency to perform the touch operations or the partition using the lower frequency to perform the touch operations may be, but not limited to be, one of an upper-half screen and a lower-half screen of the touch display panel. The partition using the higher frequency to perform the touch operations or the partition using the lower frequency to perform the touch operations may also be, but not limited to be, one of a left-half screen and a right-half screen of the touch display panel. The partition using the higher frequency to perform the touch operations or the partition using the lower frequency to perform the touch operations may also be a part of the touch display panel or another part of the touch display panel, wherein areas of the part of the touch display panel and the another part of the touch display panel are the same or are different.

In the present embodiment, the second working mode may be understood as a mode that touch operations are performed in the first partition and the second partition with different report rates. In this way, it is possible to use a high report rate to perform touch operations in the second partition, and is possible to use a low report rate to play a video in the first partition. It may not only guarantee experience in touch operations performed with a high frequency for users, but also keep power consumption of the entire touch display panel and prolong standby time to provide better experience for users. The first working mode may be understood as a mode that touch operations are performed in the entire display panel with a low frequency, or a mode that touch operations are performed in the entire display panel with a high frequency under certain circumstances, or a mode that touch operations are performed in the first partition with a low frequency and are performed in the second partition with a lower frequency. The above description for the working modes is only taken as an example, it may be flexibly set according to actual needs, and there is no limitation here.

In one of embodiments, the touch display panel further includes a touch driving integrated circuit (IC) 30, and the touch driving IC 30 is electrically connected to the touch units of the first partition 10 and the second partition 20. In response to operating in the first working mode by the touch display panel, the touch driving IC 30 provides a touch driving signal with a first driving frequency for the touch units of the first partition 10 and provides a touch driving signal with a second driving frequency for the touch units of the second partition 20, and the first driving frequency is as the same as or is different from the second driving frequency. In response to operating in the second working mode by the touch display panel, the touch driving IC provides a touch driving signal with a third driving frequency for the touch units of the first partition 10 and provides a touch driving signal with a fourth driving frequency for the touch units of the second partition 20, and the third driving frequency is different from the fourth driving frequency.

In the present embodiment, it is not only that different report rates may be used in different partitions for sampling touch signals independently, but also that different driving frequencies may be used in different partitions for driving and scanning independently.

It needs to be noted that the scanning signals may be, but is not limited to be, square-wave signals. The higher a frequency or a driving frequency of the square-wave signals, the shorter the time required to scan the touch display panel per frame, and it is more conducive to increase report rates used for the touch display panel.

It can be understood that touch electrodes may include, but is not limited to, the scanning electrodes Tx, and may further include the sensing electrodes Rx corresponding to the scanning electrode Tx. A report rate may be mainly understood as a value corresponding to reciprocal of time taken for the scanning electrodes Tx of a corresponding partition to be scanned by scanning signals SS.

Based on this, a higher driving frequency is used for the partition using the higher frequency to perform the touch operations, a higher report rate may be realized to use, and the higher report rate may respond to experience in touch operations more quickly for users. A lower driving frequency is used for the partition using the lower frequency to perform the touch operations, which may be mainly used for display and supplemented by touch operations, and charging and discharging speed of capacitor electrodes also become lower. Therefore, according to the touch display panel, better experience in touch operations may be had for users, and this state may be maintained with lower power consumption.

In one of embodiments, each pair of the first driving frequency and the first report rate, the second driving frequency and the second report rate, the third driving frequency and the third report rate, and the fourth driving frequency and the fourth report rate satisfies the following relation:

$$RP=1/((1/F)*M)$$

Wherein, RP is a corresponding report rate, F is a corresponding driving frequency, 1/F is a corresponding driving period, and M is the number of times of scans, which is the number of driving periods in a scan period. M can be, but is not limited to be, a positive integer, such as 1, 2, 3, or 4, which can be set as required.

In one of embodiments, the touch driving IC utilizes non-noise frequencies to configure the first driving frequency, the second driving frequency, the third driving frequency, and the fourth driving frequency. It needs to be explained that a certain driving frequency is easily to cause greater noise in a signal processing process, it causes corresponding interference to the signal processing process and affects accuracy of calculation of touch coordinates. Therefore, when the touch driving IC configures corresponding driving frequencies, corresponding noise frequencies may not be selected according to needs.

In one of embodiments, the touch display panel includes a plurality of first touch electrodes arranged in a first direction and a plurality of second touch electrodes arranged in a second direction, each of the touch units includes a pair of the first touch electrode and the second touch electrode that are disposed opposite to each other. The touch driving IC 30 is electrically connected to the first touch electrodes of the first partition 10 and the second partition 20, and is configured to provide the first touch electrodes with a touch driving signal having at least one type of driving frequencies including the first driving frequency, the second driving frequency, the third driving frequency, and the fourth driving frequency. The touch driving IC 30 is further electrically connected to the second touch electrodes of the first partition 10 and the second partition 20, and is configured to receive a touch signal having a mixed frequency and generated by the second touch electrodes of the first partition and the second partition.

It needs be noted that the scanning electrodes Tx and the sensing electrodes Rx are in units of strips. Each of the scanning electrodes Tx may include a plurality of first transparent electrodes connected along a second direction SD. The plurality of the sensing electrodes Rx are disposed along the second direction SD, and each of the sensing electrodes Rx may include a plurality of second transparent electrodes connected along a first direction FD. The first direction FD is different from the second direction SD, and the first transparent electrodes and the second transparent electrodes may be, but not limited to be, shaped as rhombus or other shapes. Wherein, the first direction FD may be perpendicular to the second direction SD. For example, the first direction FD may be a vertical direction, and correspondingly, the second direction SD may be a horizontal direction; or the second direction SD may be a vertical direction, and correspondingly, the first direction FD may be a horizontal direction.

It needs to be noted that in the present embodiment, when touch positions need to be located, the sensing signals in the sensing electrodes Rx are simultaneously received at a fixed time interval, and the touch positions can be accurately and quickly located according to a change of the sensing signals and a frequency of the sensing signals. Wherein, a value of the fixed time interval is time of scanning the first partition 10, or time of scanning the second partition 20, or sum of time of scanning the first partition 10 and the second partition 20. It can be understood that one sensing signal received in each fixed time interval may be used to locate a touch position. That is, sampling touch signals is performed every fixed time interval to quickly recognize touch operations performed by users, and based on a frequency and change of the sensing signals, coordinates of the touch position are calculated and reported to a host or an application processor 40.

It needs to be noted that the touch driving the IC 30 simultaneously receives the touch signals generated from the first partition 10 and second partition 20, and a driving frequency of the touch signals generated from the first partition 10 is different from a driving frequency of the touch signals generated from the second partition 20 (for example, while performing the second working mode). Therefore, after the touch signals with different driving frequencies enter the touch driving IC 30, a touch signal with a corresponding mixed frequency is formed. Therefore, in a process for calculating touch coordinates, a touch driving IC 30 with a filter NBF is needed, wherein the filter NBF may be, but not limited to be, configured to separate the mixed frequency used for the touch signal to obtain single-frequency touch signals. On this basis, calculation for touch coordinates can be performed according to the prior art. It needs to be noted that the filter NBF may also be used for filtering out parts of noise interference, which helps to achieve accurate calculation on touch coordinates.

It needs to be noted that if the scanning signals with the same driving frequency are used by the first partition and the second partition to scan in touch operations, the partitions may not need to be driven independently, and the entire display panel may be driven, that is, one touch scanning signal with the same driving frequency is used to scan the entire first partition and second partition, and touch positions are reported.

In one of embodiments, a ratio of the third report rate to the fourth report rate is a positive integer, or a ratio of the fourth report rate to the third report rate is a positive integer. For example, one report rate is 120 Hz, and another one report rate is 240 Hz.

In a second aspect, the present application provides a touch display device, which includes the touch display panel in any embodiment.

It can be understood that in the touch display device provided by the present embodiment, different report rates are used to report by the first partition 10 and the second partition 20, which may also achieve better experience in touch operations with lower power consumption.

It can be understood that the driving frequency disclosed in the present embodiment is a frequency of the touch driving signal.

In one of embodiments, a plurality of scanning electrodes Tx arranged along a first direction FD, and these scanning electrodes Tx are divided into multiple groups, each of the groups has the same number of the scanning electrodes Tx adjacent to each other. Scanning signals with a third frequency are carried by each of the groups of the scanning electrodes Tx located in the first partition 10, scanning signals with a fourth frequency are carried by each of the groups of the scanning electrodes Tx located in the second partition 20, and the third frequency is different from the fourth frequency.

In one of embodiments, at least one scanning electrode Tx is reused in one of two adjacent groups. It needs to be noted that if the number of the scanning electrodes Tx is not enough to be evenly divided, for example, there are a total of 17 scanning electrodes Tx in the touch display panel, and 4 scanning electrodes Tx are assigned as one group, how many groups should be divided into, 5 groups of course. In this way, there is only one scanning electrode Tx in one of the groups, and 3 scanning electrodes Tx adjacent to the one scanning electrode Tx need to be reused. Of course, the 3 scanning electrodes Tx that are reused can be, but are not limited to be, located in the same group, they can also be scanning electrodes Tx adjacent to the one scanning electrode Tx and located in different groups.

It needs to be noted that the two groups including the reused scanning electrodes Tx are located in the first partition 10 or the second partition 20, so that scanning signals with the same driving frequency may be carried by the reused scanning electrodes Tx and the one scanning electrode Tx to simplify complexity of circuit or signal design. That is, the two groups including the reused scanning electrodes Tx are located in the first partition 10 or/and the second partition 20.

It needs to be noted that scanning signals with the same phase are carried by the scanning electrodes Tx in the same group to simultaneously scan the scanning electrodes Tx in the same group, which speeds up scanning speed, shortens scanning time per frame, and increases report rates used for the touch display panel. Scanning signals with different phases are carried by the scanning electrodes Tx in different groups to scan different groups in a default sequence. The default sequence can be, but not limited to be, a sequence of sequentially scanning each of the groups along the first direction FD, it can be a sequence of sequentially scanning each of the groups along a direction opposite to the first direction FD, it can also be another sequence of sequentially scanning at intervals.

In one of embodiments, the number of the groups in the first partition 10 and the number of the groups in the second partition 20 may be, but not limited to be, equal or unequal, and they can be adjusted according to products or user requirements.

Figure 2:
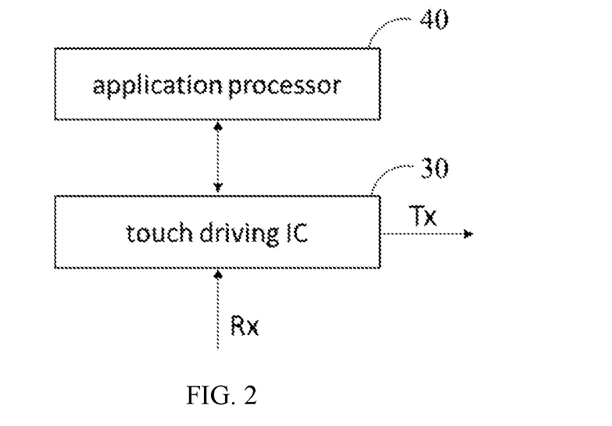
FIG. 2 is a second schematic diagram showing a structure of a touch display panel according to an embodiment of the present application.

As shown in FIG. 2, in one of embodiments, the touch panel further includes a touch driving IC 30. The touch driving IC 30 is connected to scanning electrodes Tx and sensing electrodes Rx. The touch driving IC 30 is configured to provide scanning signals and sensing signals, and is configured to receive touch signals at a fixed time interval to locate corresponding touch positions.

As shown in FIG. 2, in one of embodiments, the touch display panel further includes an application processor 40, and the application processor 40 is connected to the touch driving IC 30. The touch driving IC 30 reports touch positions to the application processor 40, and the touch driving IC 30 correspondingly adjusts the third frequency and the fourth frequency according to the modes operating in different screens and performed by the application processor 40.

It can be understood that the touch driving IC 30 may provide scanning signals with corresponding frequencies and/or phases, and calculate touch positions through a corresponding algorithm according to a change of the sensing signals. For example, a plane coordinate is used for locating, and touch positions are reported to the application processor 40 or a host. The application processor 40 can self-adjust the modes operating in different screens based on needs of users or applications, and the touch driving IC 30 further adjusts driving frequencies used for corresponding partitions according to the modes operating in different screens to improve experience in touch operations.

Figure 3:
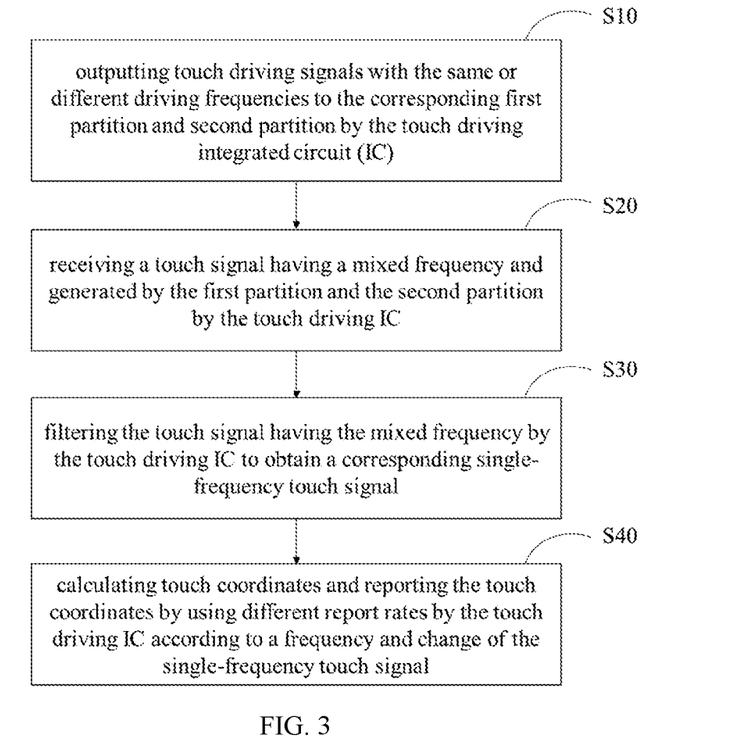
FIG. 3 is a schematic flowchart of a method for driving by touching according to an embodiment of the present application.

In one of embodiments, the present application provides a method for driving a touch display panel by touching. The touch display panel includes a first partition 10 and a second partition 20. The method shown in FIG. 3 includes the steps of:

Step S10: outputting touch driving signals with the same or different driving frequencies to the corresponding first partition 10 and second partition 20 by the touch driving integrated circuit (IC) 30.

Step S20: receiving a touch signal having a mixed frequency and generated by the first partition 10 and the second partition 20 by the touch driving IC 30.

Step S30: filtering the touch signal having the mixed frequency by the touch driving IC 30 to obtain a corresponding single-frequency touch signal.

Step S40: calculating touch coordinates and reporting the touch coordinates by using different report rates by the touch driving IC 30 according to a frequency and change of the single-frequency touch signal.

In one of embodiments, each of the first partition 10 and the second partition 20 includes a plurality of touch units (not shown). The touch units are configured to access the touch driving signals to generate corresponding touch signals.

Specifically, each of the touch units includes a pair of the first touch electrode and the second touch electrode that are disposed opposite to each other. The first touch electrodes are configured to access the corresponding touch driving signals, and the second touch electrodes are configured to generate the corresponding touch signals.

Wherein, the first touch electrodes may be, but not limited to be, scanning electrodes Tx, and the second touch electrodes may be, but not limited to be, sensing electrodes Rx.

In one of the embodiments, the touch driving IC 30 outputs a touch driving signal with a third driving frequency to the first partition, and the touch driving IC 30 outputs a touch driving signal with a fourth driving frequency to the second partition, wherein the third driving frequency is different from the fourth driving frequency.

It can be understood that in the method for driving the touch display panel by touching provided by the present embodiment, different report rates are used to report by the first partition 10 and the second partition 20, which may also achieve better experience in touch operations with lower power consumption.

In one of embodiments, a value of the report rate used for the touch display panel is reciprocal of time taken for the touch driving IC 30 to scan the entire touch display panel per frame, and the time taken for the touch driving IC 30 to scan the entire touch screen per frame is sum first self-and-mutual capacitance switching time t1, self-capacitance scanning time t2, second self-and-mutual capacitance switching time t3, mutual-capacitance scanning time t4, and interference (noise) scanning time t5. For existing mutual-capacitance touch display screens, if touch operations are performed and the mutual-capacitance scanning time t4 is the most time-consuming time in one frame, which is closely related to a single square-wave time-consuming T of the scanning signals, the number of the scanning electrodes in the touch display panel, and scanning groups.

For example, the number of the scanning electrodes Tx and the sensing electrodes Rx are 17 and 37 in the touch display panel, where the number of the sensing electrodes Rx are 37, the number of the scanning electrodes Tx are 17, and 4 scanning electrodes are assigned as one group for scanning 17 scanning electrodes require to be divided into 5 groups and scanned in 5 times, wherein a first scanning electrode Tx1 to a fourth scanning electrode Tx4 are assigned as one group, a fifth scanning electrode Tx5 to a scanning electrode Tx8 are assigned as one group, a ninth scanning electrode Tx9 to a twelfth scanning electrode Tx12 are assigned as one group, a thirteenth scanning electrode Tx13 to a sixteenth scanning electrode Tx16 are assigned as one group, and a seventeenth scanning electrode Tx17 is left in the end, so that a fourteenth scanning electrode Tx14 to the seventeenth scanning electrode Tx17 are assigned as a last group, which is equivalent to scanning the fourteenth scanning electrode Tx14 to the sixteenth scanning electrode Tx16 twice.

In this way, the scanning electrodes Tx of the touch display panel are grouped. For example, the first scanning electrode Tx1 to the fourth scanning electrode Tx4 are scanned by the same waveform at the same time, and the number of single square-waves contained in this waveform is a key to affect scanning time of this waveform, that is, scanning time for sampling. Therefore, a corresponding driving frequency can be controlled by adjusting the number of the single square-waves contained in one scanning waveform.

The more the number of the single square-waves contained in one scanning waveform, the longer sampling time is, the greater corresponding power consumption is. In order to save power, the present disclosure provides a touch display panel having different sampling rate in separating screens. For a touch display panel capable of folding up and down, when performing multitasking operations on separating screens, an upper-half screen is used to perform an ordinary operation task for display, and a lower-half screen is used to perform a high-requirement operation task such as a game mode. Report rates used for the upper-half screen and the lower-half screen are different, the upper-half screen is used to perform the ordinary operation task for display, and a lower report rate is used, such as 120 Hz. The lower-half screen is used to perform the high-requirement operation task such as the game mode, and a higher report rate is used, such as 240 Hz.

According to the present disclosure, it greatly meets current demands for high report rates used for e-sports and game modes, and greatly reduces power consumption of the touch screen as possible.

The touch display panel includes the upper-half screen and the lower-half screen to perform different tasks having different requirements. In the same touch display panel, different report rates are used by the upper-half screen and the lower-half screen. For example, the upper-half screen is used to perform an ordinary operation mode, and an ordinary report rate is used for the upper-half screen; the lower-half screen is used to perform a high-frequency operation mode, and a higher report rate is used for the lower-half screen.

Wherein, in the present embodiment, a value of the first self-and-mutual capacitance switching time t1 is an actual value obtained by an oscilloscope. 2 self-capacitive waveforms are included during the self-capacitance scanning time t2, each of the waveforms has 80 pulses, that is, which is equal to 2*80*(2*3RC). A value of the second self-and-mutual capacitance switching time t3 is an actual value obtained by an oscilloscope. Waveforms used for scanning 17 scanning electrodes TX are included during the mutual-capacitance scanning time t4, 4 scanning electrodes TX are assigned as one group, there are 5 groups, each of the waveforms has 64 pulses, that is, which is equal to 64*4*5*

(2*3RC). A value of the interference (noise) scanning time t5 is an actual value obtained by an oscilloscope.

Report rate table 1-1

| | unit | calculation result | mutual capacitance TX pulse 64→44 |
|---|---|---|---|
| 3RC | us | 1.42 | 1.42 |
| The number of scanning electrodes TX | stripe | 17 | 17 |
| The number of sensing electrodes RX | stripe | 37 | 37 |
| Simulation frequency | kHz | 352 | 352 |
| Single square-wave time-consuming T | us | 2.84 | 2.84 |
| First self-and-mutual capacitance switching time t1 | us | 102 | 102 |
| Self-capacitance scanning time t2 | us | 454.4 | 454.4 |
| Second self-and-mutual capacitance switching time t3 | us | 110 | 110 |
| Mutual-capacitance scanning time t4 | us | 3635.2 | 2499.2 |
| Interference scanning time t5 | us | 1000 | 1000 |
| scanning time per frame T10 | us | 5301.6 | 4165.6 |
| Report rate | Hz | 189 | 240 |

Wherein, the single square-wave time-consuming T is usually determined by time constant 3RC of the touch display panel. After designs of the display panel are determined, 3RC is usually determined accordingly.

As shown in the report rate table 1-1, if the number of the single square-waves contained in one scanning waveform is reduced from 64 to 44, the mutual-capacitance scanning time t4 is also reduced from 3635.2 us to 2499.2 us, thus the scanning time per frame T10 is also reduced to 4165.6 us, thereby increasing the report rate to 240 Hz.

Figure 4:
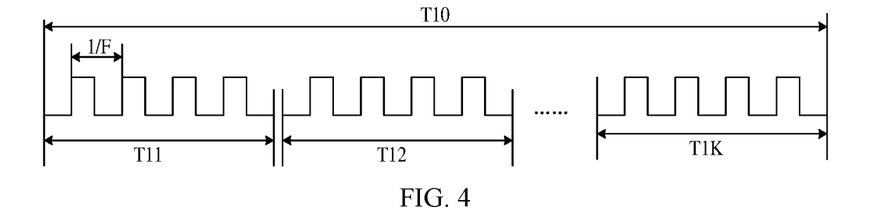
FIG. 4 is first schematic diagram showing a time sequence for scanning according to an embodiment of the present application.

As shown in FIG. 4, the scanning time per frame T10 is related to a frequency F of the scanning signals, which includes sum of scanning time of each group, for example, scanning time of a first group is T11, scanning time of a second group is T12, and so on, scanning time of Kth group is T1K, wherein K is an integer.

The present disclosure further provides a touch display panel having different sampling rate in separating screens. The number of single square-waves contained in one scanning waveform in the upper-half screen and the lower-half screen is adjusted to adjust corresponding scanning time for sampling, thereby adjusting corresponding report rates.

For example, as mentioned above, in the present embodiment, the number of scanning electrodes Tx in the upper-half screen and the lower-half screen is basically the same, which is equivalent to halving the number of scanning electrodes Tx, and same single-frequency scanning waveforms are used by the scanning electrodes Tx in the upper-half screen and the lower-half screen. When a driving scheme is used, the number of single square-waves contained in one scanning waveform in the upper-half screen is larger, such as M, so that time of one waveform and the mutual-capacitance scanning time of the entire upper-half screen is longer, and corresponding report rate is low, such as 120 Hz.

At the same time, the number of single square-waves contained in one scanning waveform in the upper-half screen is small, such as N, so that time of one waveform and the mutual-capacitance scanning time of the entire upper-half screen is shorter, and corresponding report rate is high, such as 240 Hz, wherein M>N.

The present invention supports to operate different modes in separating screens, when performing e-sports or game modes, a high sampling rate is guaranteed to obtain an enjoyable experience without excessively increasing power consumption. For operating different modes in separating screens, different report rates are used for different screens having different application requirements to meet demands of reducing power consumption as much as possible.

Figure 5:
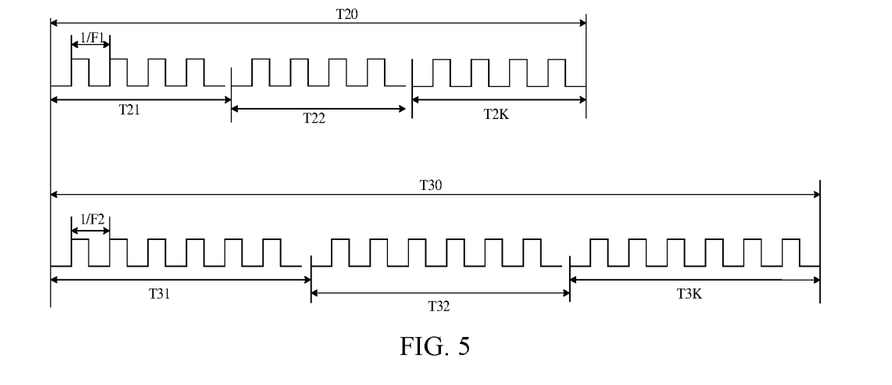
FIG. 5 is second schematic diagram showing a time sequence for scanning according to an embodiment of the present application.

As shown in FIG. 5, scanning time per frame T20 of the upper-half screen is related to a frequency F1 of the scanning signals of corresponding partitions, which includes sum of scanning time of each of the groups in the corresponding partitions. For example, scanning time of a first group is T21, scanning time of a second group is T22, and so on, scanning time of Kth group is T2K, wherein K is an integer.

With the same reason, scanning time per frame T30 of the lower-half screen is related to a frequency F2 of the scanning signals of the corresponding partitions, which includes sum of scanning time of each of the groups in the corresponding partitions. For example, scanning time of a first group is T31, scanning time of a second group is T32, and so on, scanning time of Kth group is T2K, wherein K is an integer.

According to the present disclosure, it greatly meets current demands for high report rates used for e-sports and game modes, and greatly reduces power consumption of the touch screen as possible.

The touch display panel includes the upper-half screen and the lower-half screen to perform different tasks having different requirements. In the same touch display panel, different report rates are used by the upper-half screen and the lower-half screen. For example, the upper-half screen is used to perform an ordinary operation mode, and an ordinary report rate is used for the upper-half screen; the lower-half screen is used to perform a high-frequency operation mode, and a higher report rate is used for the lower-half screen.

The touch display panel provided by the present disclosure have different sampling rate in separating screens, and when different display operation tasks are performed on the upper-half screen and the lower-half screen in the same panel, different touch report rates are used by the screens. For example, compared with an existing touch display panel using only one touch report rate, when an ordinary mode is performed, an ordinary report rate is used for the entire panel, such as 60 Hz/120 Hz, when a game mode is performed, a high report rate is switched and is used for the entire display, such as 180 Hz, 240 Hz, even higher than 240 Hz.

The present invention supports to operate different modes with different report rates in separating screens, when performing e-sports or game modes, a high sampling rate is guaranteed to obtain an enjoyable experience without excessively increasing power consumption. For operating different modes in separating screens, different report rates are used for different screens having different application requirements to meet demands of reducing power consumption as much as possible.

Generally, the entire panel is scanned once according to one report rate, and all the scanning electrodes Tx of the touch display panel need to scanned, then coordinates of touch positions are calculated, and finally the touch driving IC 30 reports the coordinates of the touch positions to a host. Therefore, for the existing touch display panel having one display screen, one report rate is usually used for the entire screen, such as 120 Hz/240 Hz, one of the two need to be selected; or the entire screen can be switched, for example if a refresh rate for display is 60 Hz, and a report rate used for sampling on the entire screen is 120 Hz; if a refresh rate for display is switched to 90 Hz, a report rate used for sampling on the entire screen is switched to 120 Hz.

It can be understood that, in the embodiment of the present application, the host is equivalent to the application processor 40.

The present disclosure provides a touch display panel having different sampling rate in separating screens. For example, the number of scanning electrodes Tx and sensing electrodes Rx of the touch display panel are 20 and 40. When an ordinary working mode is operated on the entire display, channels of a first scanning electrode Tx1 to a twentieth scanning electrodes Tx20 are scanned with a fixed driving frequency by the touch driving IC 30, such as 200 KHz square-waves. The report rate used by the entire panel is a specific value, such as 120 Hz.

A specific example is described as below: in the ordinary mode, there are 20 scanning electrodes of the first scanning electrode Tx1 to the twentieth scanning electrode Tx20, and 20 scanning channels are formed. The scanning electrodes Tx are grouped and scanned sequentially. After scanning all 20 scanning electrodes Tx, the touch driving IC 30 calculates corresponding coordinates according to positions where capacitance values change to generate interrupt signals and report to a host.

The present disclosure provides a touch display panel having different sampling rate in separating screens. After scanning channels of half of the panel are scanned by a touch driving IC 30, the touch driving IC 30 reports touch coordinates immediately. The scanning channels of an upper-half screen and a lower-half screen are scanned independently, and touch coordinates of the upper-half screen and the lower-half screen are reported independently.

It can be understood that the touch driving IC 30 is provided with a filter NBF. The filter NBF filters processed sensing signals, and the touch driving IC30 is configured to recognize and process touch locations in the first partition 10 and/or touch locations in the second partition 20.

Figure 6:
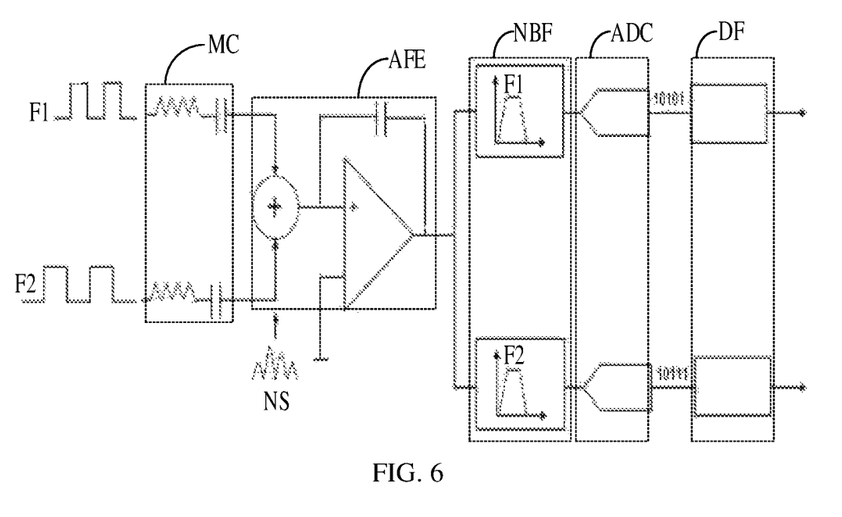
FIG. 6 is a schematic diagram showing an equivalent circuit model according to an embodiment of the present application.

Specifically, as shown in FIG. 6, when touch operations are performed, scanning signals with a frequency F1 in the first partition 10 and scanning signals with a frequency F2 in the second partition 20 are coupled by a mutual capacitance MC to generate corresponding sensing signals, the sensing signals are received and processed by an analog front end amplifier AFE of the touch driving IC 30, and the sensing signals become sensing signals having a mixed frequency. The filter NBF composed of specific capacitors and resistor circuits is provided inside the touch driving IC 30, wherein the filter NBF is a narrow bandwidth filter, which allows received signals with a specific and default frequency to pass-through, and greatly attenuates or suppresses signals having other frequencies. Wherein, filtering signals is a prerequisite and basis for signal processing. A main purpose of filtering is to filter out useless interference signals or signals irrelevant to target signals, and then obtain signals required by a system.

Received analog electrical signals (specific voltage amplitude/certain frequency) are filtered inside the touch driving IC 30. That is, after signals having a specific frequency pass through the filter NBF inside the touch driving IC, a large number of signals including target signals/various noise signals NS are received, and then desired part of these signals are intercepted.

Further, corresponding sensing signals come from the first partition 10 or the second partition 20 can be recognized, and touch locations in the first partition 10 and/or touch locations in the second partition 20 are processed independently.

Generally, after filtering analog signals inside the touch driving IC, the obtained analog signals are converted by an analog-to-digital converter ADC to obtain digital signals (such as 10101 or 10111), and then the digital signals are filtered by a digital filter DF to obtain target data required for calculating touch coordinates inside the touch driving IC.

A core for filtering the digital signals is to use a digital signal processor (DSP), and the DSP is disposed inside the touch driving IC. Algorithms or devices for filtering digital signals are implemented by digital multipliers, adders, and other units. Input discrete digital signal codes are processed, and processes of which are calculated according to pre-programmed programs.

A display panel capable of folding up and down is taken as an example for description. For example, the number of scanning electrodes Tx and sensing electrodes Rx is 20 and 40. Horizontal channels are designed as the scanning electrodes Tx, and vertical channels are designed as the sensing electrodes Rx according to design requirements. A first scanning electrode Tx1 to a tenth scanning electrode Tx10 are disposed in an upper-half screen, and an eleventh scanning electrode Tx11 to a twentieth scanning electrode Tx20 are disposed in a lower-half screen. The first scanning electrode Tx1 to the tenth scanning electrode Tx10 and the eleventh scanning electrode Tx11 to the twentieth scanning electrode Tx20 are scanned separately and independently, and a first sensing electrode Rx1 to a fortieth sensing electrode Rx40 receive signals together.

When an operation mode of an AP (application processor 40) of a mobile phone is switched from a state of operating on an entire display to a state of operating on separating up-and-down screens. A host of the AP notifies the touch driving IC 30 to switch the operation mode to two independent operation modes for operating on the upper-half screen and the lower-half screen, the upper screen is operated in an ordinary display touch mode, and the lower screen is operated in a game mode.

The touch driving IC30 switches modes according to instructions issued by the AP, and the first scanning electrode Tx1 to the tenth scanning electrode Tx10 are driven by a fixed driving frequency, such as 200 KHz, to keep an ordinary report rate. After scanning the first ten channels of the first scanning electrode Tx1 to the tenth scanning electrode Tx10 (scanning the upper-half screen), the touch driving IC 30 reports a coordinate of a touch position immediately, and a report rate can be an ordinary value, such as 120 Hz.

At the same time, when a game mode is operated on the lower-half screen, the eleventh scanning electrode Tx11 to the twentieth scanning electrode Tx20 are driven by a driving frequency different from the driving frequency used in the upper-half screen, such as 250 KHz. While scanning the first scanning electrode Tx1 to the tenth scanning electrode Tx10, the eleventh scanning electrode Tx11 to the twentieth scanning electrode Tx20 are also scanned at the same time (scanning the upper-half screen). After scanning the last ten channels, a coordinate of a touch position is also reported with a higher report rate, such as 240 Hz.

A report rate is usually reciprocal of time taken for target electrodes Tx to be scanned in a touch operation.

Electrode channels capable of continuous conduction in a lateral direction are the scanning electrodes Tx, and electrode channels capable of continuous conduction in a vertical direction are the sensing electrodes Rx. Each of the upper-half screen and the lower-half screen uses a square wave with a single driving frequency.

According to the present disclosure, in an actual work, the upper-half screen and the lower-half screen can be scanned by waveforms with the same cycle and number. Since the number of single square-waves contained in one waveform in the upper-half screen and the lower-half screen are different, corresponding touch report rates are different.

Different tasks are performed and different modes are operated on the upper-half screen and the lower-half screen of the touch display panel. In the same touch display panel, different touch report rates are used by the upper-half screen and the lower-half screen.

The present disclosure realizes that different report rates are used by separating screens in the same touch display panel. That is, different touch report rates are used by the upper-half screen and the lower-half screen.

According to the present disclosure, it greatly meets current demands for high report rates used for e-sports and game modes, and greatly reduces power consumption of the touch screen as possible, thereby greatly reducing power consumption of the entire mobile phone and increasing the battery life of the mobile phone.

It can be understood that for persons skilled in this art, equivalent substitutions or modifications can be made according to the technical solutions and inventive concepts of the present application, and all these modifications or substitutions shall fall within the protection scope of the appended claims of the present application.

What is claimed is:

1. A touch display panel, operating at least in a first working mode and a second working mode and comprising a first partition and a second partition, wherein each of the first partition and the second partition comprises a plurality of touch units;
    wherein in response to operating in the first working mode by the touch display panel, a first report rate is used by all the touch units in the first partition for sampling touch signals and a second report rate is used by all the touch units in the second partition for sampling touch signals, and the first report rate is as the same as or is different from the second report rate; and
    wherein in response to operating in the second working mode by the touch display panel, a third report rate is used by all the touch units in the first partition for sampling touch signals and a fourth report rate is used by all the touch units in the second partition for sampling touch signals, and the third report rate is different from the fourth report rate.

2. The touch display panel as claimed in claim 1, further comprising a touch driving integrated circuit (IC) electrically connected to the touch units of the first partition and the second partition;
    wherein in response to operating in the first working mode by the touch display panel, the touch driving IC provides a touch driving signal with a first driving frequency for the touch units of the first partition and provides a touch driving signal with a second driving frequency for the touch units of the second partition, and the first driving frequency is as the same as or is different from the second driving frequency; and
    wherein in response to operating in the second working mode by the touch display panel, the touch driving IC provides a touch driving signal with a third driving frequency for the touch units of the first partition and provides a touch driving signal with a fourth driving frequency for the touch units of the second partition, and the third driving frequency is different from the fourth driving frequency.

3. The touch display panel as claimed in claim 2, wherein each pair of the first driving frequency and the first report rate, the second driving frequency and the second report rate, the third driving frequency and the third report rate frequency, and the fourth driving frequency and the fourth report rate satisfies the following relation:

$$RP=1/((1/F)*M)$$

wherein RP is a corresponding report rate, F is a corresponding driving frequency, 1/F is a corresponding driving period, and M is the number of times of scans, which is the number of driving periods in a scan period.

4. The touch display panel as claimed in claim 3, wherein the first partition and the second partition use a same number of times of scans.

5. The touch display panel as claimed in claim 2, wherein the touch driving IC utilizes non-noise frequencies to configure the first driving frequency, the second driving frequency, the third driving frequency, and the fourth driving frequency.

6. The touch display panel as claimed in claim 1, comprising a plurality of first touch electrodes arranged in a first direction and a plurality of second touch electrodes arranged in a second direction, wherein each of the touch units comprises a pair of the first touch electrode and the second touch electrode that are disposed opposite to each other;
    wherein the touch driving IC is electrically connected to the first touch electrodes of the first partition and the second partition, and is configured to provide the first touch electrodes with a touch driving signal having at least one type of driving frequencies comprising the first driving frequency, the second driving frequency, the third driving frequency, and the fourth driving frequency; and
    wherein the touch driving IC is further electrically connected to the second touch electrodes of the first partition and the second partition, and is configured to receive a touch signal having a mixed frequency and generated by the second touch electrodes of the first partition and the second partition.

7. The touch display panel as claimed in claim 6, wherein the touch driving IC comprises a filter;
    wherein the filter is configured to separate the touch signal having the mixed frequency to obtain a corresponding single-frequency touch signal configured to obtain sampling information for touch positions on the first partition and the second partition.

8. A touch display device, comprising the touch display panel as claimed in claim 1.

9. The touch display device as claimed in claim 8, wherein a ratio of the third report rate to the fourth report rate is a positive integer, or a ratio of the fourth report rate to the third report rate is a positive integer.

10. The touch display device as claimed in claim 9, the touch display panel further comprises a touch driving integrated circuit (IC) electrically connected to the touch units of the first partition and the second partition;
    wherein in response to operating in the first working mode by the touch display panel, the touch driving IC provides a touch driving signal with a first driving frequency for the touch units of the first partition and provides a touch driving signal with a second driving frequency for the touch units of the second partition, and the first driving frequency is as the same as or is different from the second driving frequency; and wherein in response to operating in the second working mode by the touch display panel, the touch driving IC provides a touch driving signal with a third driving frequency for the touch units of the first partition and provides a touch driving signal with a fourth driving frequency for the touch units of the second partition, and the third driving frequency is different from the fourth driving frequency.

11. The touch display device as claimed in claim 10, wherein each pair of the first driving frequency and the first report rate, the second driving frequency and the second report rate, the third driving frequency and the third report rate frequency, and the fourth driving frequency and the fourth report rate satisfies the following relation:

$$RP=1/((1/F)*M)$$

wherein RP is a corresponding report rate, F is a corresponding driving frequency, 1/F is a corresponding driving period, and M is the number of times of scans, which is the number of driving periods in a scan period.

12. The touch display device as claimed in claim 11, wherein the first partition and the second partition use a same number of times of scans.

13. The touch display device as claimed in claim 9, wherein the touch driving IC utilizes non-noise frequencies to configure the first driving frequency, the second driving frequency, the third driving frequency, and the fourth driving frequency.

14. The touch display device as claimed in claim 9, wherein the touch display panel comprises a plurality of first touch electrodes arranged in a first direction and a plurality of second touch electrodes arranged in a second direction, each of the touch units comprises a pair of the first touch electrode and the second touch electrode that are disposed opposite to each other;

wherein the touch driving IC is electrically connected to the first touch electrodes of the first partition and the second partition, and is configured to provide the first touch electrodes with a touch driving signal having at least one type of driving frequencies comprising the first driving frequency, the second driving frequency, the third driving frequency, and the fourth driving frequency; and wherein the touch driving IC is further electrically connected to the second touch electrodes of the first partition and the second partition, and is configured to receive a touch signal having a mixed frequency and generated by the second touch electrodes of the first partition and the second partition.

15. The touch display device as claimed in claim 14, wherein the touch driving IC comprises a filter;

wherein the filter is configured to separate the touch signal having the mixed frequency to obtain a corresponding single-frequency touch signal configured to obtain sampling information for touch positions on the first partition and the second partition.

16. The touch display device as claimed in claim 14, wherein the touch driving IC receives the touch signal having the mixed frequency at a fixed time interval.

17. A method for driving a touch display panel by touching, wherein the touch display panel comprises a first partition and a second partition, and the method comprises steps of:

outputting touch driving signals with the same or different driving frequencies to the corresponding first partition and second partition by the touch driving integrated circuit (IC);

receiving a touch signal having a mixed frequency and generated by the first partition and the second partition by the touch driving IC;

filtering the touch signal having the mixed frequency by the touch driving IC to obtain a corresponding single-frequency touch signal; and calculating touch coordinates and reporting the touch coordinates by using different report rates by the touch driving IC according to a frequency and change of the single-frequency touch signal.

18. The method as claimed in claim 17, wherein each of the first partition and the second partition comprises a plurality of touch units electrically connected to the touch driving IC; and wherein the touch units are configured to access the touch driving signals to generate corresponding touch signals.

19. The method as claimed in claim 18, wherein each of the touch units comprises a pair of the first touch electrode and the second touch electrode that are disposed opposite to each other; the first touch electrodes are configured to access the corresponding touch driving signals; the second touch electrodes are configured to generate the corresponding touch signals.

20. The method as claimed in claim 17, wherein the touch driving IC outputs a touch driving signal with a third driving frequency to the first partition, and the touch driving IC outputs a touch driving signal with a fourth driving frequency to the second partition, wherein the third driving frequency is different from the fourth driving frequency.

* * * * *